United States Patent [19]
Imai

[11] Patent Number: 5,769,460
[45] Date of Patent: Jun. 23, 1998

[54] CONNECTOR FOR TUBULAR GUIDE RAILS

[75] Inventor: Kazuhisa Imai, Ojima, Japan

[73] Assignee: I. Tech Inc., Japan

[21] Appl. No.: 637,093

[22] Filed: Apr. 24, 1996

[51] Int. Cl.[6] ..................................................... F16L 35/00
[52] U.S. Cl. .............................. 285/18; 285/24; 285/305; 285/371; 285/420; 403/292
[58] Field of Search ..................................... 285/370, 371, 285/24, 18, 420, 305; 403/292, 293; 104/118, 138.1, 290

[56] References Cited

U.S. PATENT DOCUMENTS

| | | | |
|---|---|---|---|
| 958,751 | 5/1910 | Lovett | 285/420 X |
| 1,298,878 | 4/1919 | Brown | 285/305 X |
| 1,312,625 | 8/1919 | Gold | 285/305 X |
| 2,868,563 | 1/1959 | Wood | 285/305 X |
| 4,927,192 | 5/1990 | Ungchusri et al. | 285/305 |
| 5,078,534 | 1/1992 | White | 403/292 |
| 5,388,526 | 2/1995 | Imai . | |

*Primary Examiner*—Dave W. Arola
*Attorney, Agent, or Firm*—Bachman & LaPointe, P.C.

[57] ABSTRACT

In order to connect two tubular guide rails, a connector is used. Each tubular guide rail is formed with an elongate rounded recess which extends perpendicular to the longitudinal axis of the tubular guide rail. A seal member of elastic material is to be put between terminal ends of the two tubular guide rails. A joint plate has two parallel elongate rounded recesses formed therein. The joint plate is connectable to the two tubular guide rails in such a manner that each of the parallel elongate rounded recesses mates with the elongate rounded recess of the corresponding tubular guide rail to define a substantially cylindrical pin receiving space. Two cylindrical positioning pins are employed each being to be received in the substantially cylindrical pin receiving space. A securing device is employed which, when actuated, gradually presses the joint plate against the tubular guide rails and finally secures the joint plate to the tubular guide rails. In the invention, the following inequality is kept established before actuation of the securing device, $$L < 2 \times L_1 + t$$

wherein:
L: the distance between the parallel elongate rounded recesses of the joint plate,
$L_1$: the distance between the elongate rounded recess of each tubular guide rail and the terminal end of the same, and
t: the thickness of the seal member in non-stressed state.

15 Claims, 10 Drawing Sheets

CONNECTOR FOR TUBULAR GUIDE RAILS

BACKGROUND OF THE INVENTION

1. Field of the Invention

The present invention relates in general to connectors for connecting tubular guide rails, and more particularly to connectors for hermetically coupling tubular guide rails to assemble a tubular guide way used in a fluid-power transportation system.

2. Description of the Prior Art

In order to clarify the task of the present invention, one of the fluid-power transportation systems to which the present invention can be practically applied will be briefly described with reference to FIGS. 13 to 15.

Referring to FIG. 13, there is shown a fluid-power transportation system which is installed in a production line.

The transportation system comprises a plurality of tubular guide ways each being designated by numeral 1. Each tubular guide way 1 has straight portions 1a and curved portions 1b, as shown. Work arriers 2 are incorporated with the tubular guide ways 1 in a manner to run along the same. Each carrier 2 is equipped with a chuck device 3. Between adjacent guide ways 1, there are arranged at least one production machine (no numeral) or the like which constitutes part of the production line. When a work (not shown) is conveyed to a given position by one carrier 2 running along its corresponding guide way 1, the production machine takes the work and makes a certain process to the same. Then, the work thus processed is conveyed to another given position by another carrier 2 running along its corresponding guide way 1.

As is seen from FIG. 14, each work carrier 2 comprises generally a magnet-mounted inner slider 10A which is slidably received in the tubular guide way 1 and a magnet-mounted outer slider 10B which is slidably received on the tubular guide way 1. That is, the inner and outer sliders 10A and 10B are attracted to each other by a magnetic force generated therebetween. The chuck device 3 (see FIG. 13) is connected to the outer slider 10B to move therewith. Thus, when, due to introduction of compressed air into the guide way 1 from one end, the inner slider 10A is forced to slide in the guide way 1 toward the other end, the outer slider 10B follows the inner slider 10A while carrying the work with the chuck device 3. The detailed construction of the work carrier 2 is described in U.S. Pat. No. 5,388,526 granted to the same applicant on Feb. 14, 1995.

Each tubular guide way 1 consists of a plurality of tubular guide rails which are hermetically connected to one another by connectors. As is seen from FIG. 15, each tubular guide rail has a generally T-shaped cross section and comprises a pipe part 4 along which the work carrier 2 runs and a base part 5 which supports the pipe part 4 through a ridge portion 5a.

Various types of connectors for the guide rails have been hitherto proposed and put into practical use in the above-mentioned fluid power transportation system. However, some of the connectors have failed to exhibit satisfied performance due to their inherent construction. For example, some are poor in making a hermetical connection between the pipe parts 4 of the guide rails. In fact, it is difficult and troublesome to couple the two tubular guide rails while satisfying both a coaxially aligned connection therebetween and a hermetically sealed connection therebetween. In some of the connectors, such coupling requires a highly skilled and time-consuming assembling labor work, which inevitably induces a high cost production of the guide ways 1, and thus, that of the transportation system.

SUMMARY OF THE INVENTION

It is therefore an object of the present invention to provide a connector for tubular guide rails, which is free of the above-mentioned drawbacks.

That is, according to the present invention, there is provided a connector which can couple two tubular guide rails while assuring a hermetically sealed connectin therebetween.

According to the present invention, there is provided a connector which can couple two tubular guide rails with easy assembling work.

According to a first aspect of the present invention, there is provided a connector for connecting two structures which have mutually facing terminal ends to be mated. The connector comprises means for defining in each of the structures a rounded recess; a seal member of elastic material, the seal member being to be put between the terminal ends of the two structures; a joint plate having two rounded recesses, the joint plate being connectable to the two structures in such a manner that each of the rounded recesses of the joint plate mates with the rounded recess of each structure thereby to define a substantially rounded space; two cylindrical pins each being to be received in the substantially rounded space; and securing means which, when actuated, gradually presses the joint plate against the structures and finally secures the joint plate to the structures, wherein the two structures, the seal member, the cylindrical pins and the joint plate are so arranged as to satisfy the following equation before actuation of the securing means, $$L < 2 \times L_1 + t$$

wherein:

L: the distance between the two rounded recesses of the joint plate, $L_1$: the distance between the rounded recess of each structure and the terminal end of the same, and t: the thickness of the seal member in non-stressed state.

According to a second aspect of the present invention, there is provided a connector for connecting two tubular guide rails which have terminal ends to be mated. The connector comprises first means for defining in each of the tubular guide rails an elongate rounded recess which extends perpendicular to the longitudinal axis of the tubular guide rail; a seal member of elastic material which is to be put between the terminal ends of the two tubular guide rails; a joint plate having two parallel elongate rounded recesses formed therein, the joint plate being connectable to the two tubular guide rails in such a manner that each of the parallel elongate rounded recesses mates with the elongate rounded recess of the corresponding tubular guide rail to define a substantially cylindrical pin receiving space; two cylindrical positioning pins each being to be received in the substantially cylindrical pin receiving space; and second means which, when actuated, gradually presses the joint plate against the tubular guide rails and finally secures the joint plate to the tubular guide rails, wherein the first means, the seal member and the joint plate are so arranged as to satisfy the following equation before actuation of the second means, $$L < 2 \times L_1 + t$$

wherein:

L: the distance between the parallel elongate rounded recesses of the joint plate, L$_1$: the distance between the elongate rounded recess of each tubular guide rail and the terminal end of the same, and t: the thickness of the seal member in non-stressed state.

According to a third aspect of the present invention, there is provided a connector for connecting two tubular guide rails which have terminal ends to be mated, each tubular guide rail including a pipe part and a base part. The connector comprises first means for defining in the base part of each of the tubular guide rails an elongate rounded recess which extends perpendicular to the longitudinal axis of the tubular guide rail; an O-ring of elastomeric material which is to be put between mutually facing ends of the pipe parts of the two tubular guide rails; a joint plate having two parallel elongate rounded recesses formed herein, the joint plate being connectable to the base parts of the two tubular guide rails in such a manner that each of the parallel elongate rounded recesses mates with the elongate rounded recess of the corresponding tubular guide rail to define a substantially cylindrical pin receiving space; two cylindrical positioning pins each being to be received in the substantially cylindrical pin receiving space; second means for defining in the base part of each of the tubular guide rails two longitudinally extending grooves; two elongate bridge pieces slidably received in the two longitudinally extending grooves respectively, each bridge piece being capable of taking a position wherein one half of the bridge piece is received in the groove of one tubular guide rail and the other half of the same is received in the groove of the other tubular guide rail; and bolts for securing the joint plate to the base parts of the two tubular guide rails by gradually pressing the joint plate against the base parts, wherein the first means, the O-ring and the joint plate are so arranged as to satisfy the following equation before the joint plate is pressed against the base parts by the bolts, $$L < 2 \times L_1 + t$$

wherein:

L: the distance between the parallel elongate rounded recesses of the joint plate, L$_1$: the distance between the elongate rounded recess of the base part of each tubular guide rail and the terminal end of the same, and t: the thickness of the O-ring in non-stressed state.

According to a fourth aspect of the present invention, there is provided a connector for connecting two tubular guide rails which have terminal ends to be mated, each tubular guide rail including a pipe part and a base part. The connector comprises first means for defining in the base part of each of the tubular guide rails an elongate rounded recess which extends perpendicular to the longitudinal axis of the tubular guide rail; an O-ring of elastomeric material which is to be put between mutually facing ends of the pipe parts of the two tubular guide rails; a joint plate having two parallel elongate rounded recesses formed herein, the joint plate being connectable to the base parts of the two tubular guide rails in such a manner that each of the parallel elongate rounded recesses mates with the elongate rounded recess of the corresponding tubular guide rail to define a substantially cylindrical pin receiving space; two cylindrical positioning pins each being to be received in the substantially cylindrical pin receiving space; second means for defining, in the base part of each of the tubular guide rails, threaded openings; third means for defining, in the joint plate, bolt openings; and bolts which, for securing the joint plate to the base parts of the two tubular guide rails, pass through the bolt openings and operatively engage with the threaded openings, wherein the first means, the O-ring and the joint plate are so arranged as to satisfy the following equation before the joint plate is secured to the base parts by the bolts, $$L < 2 \times L_1 + t$$

wherein:

L: the distance between the parallel elongate rounded recesses of the joint plate, L$_1$: the distance between the elongate rounded recess of the base part of each tubular guide rail and the terminal end of the same, and t: the thickness of the O-ring in non-stressed state.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Figure 1:
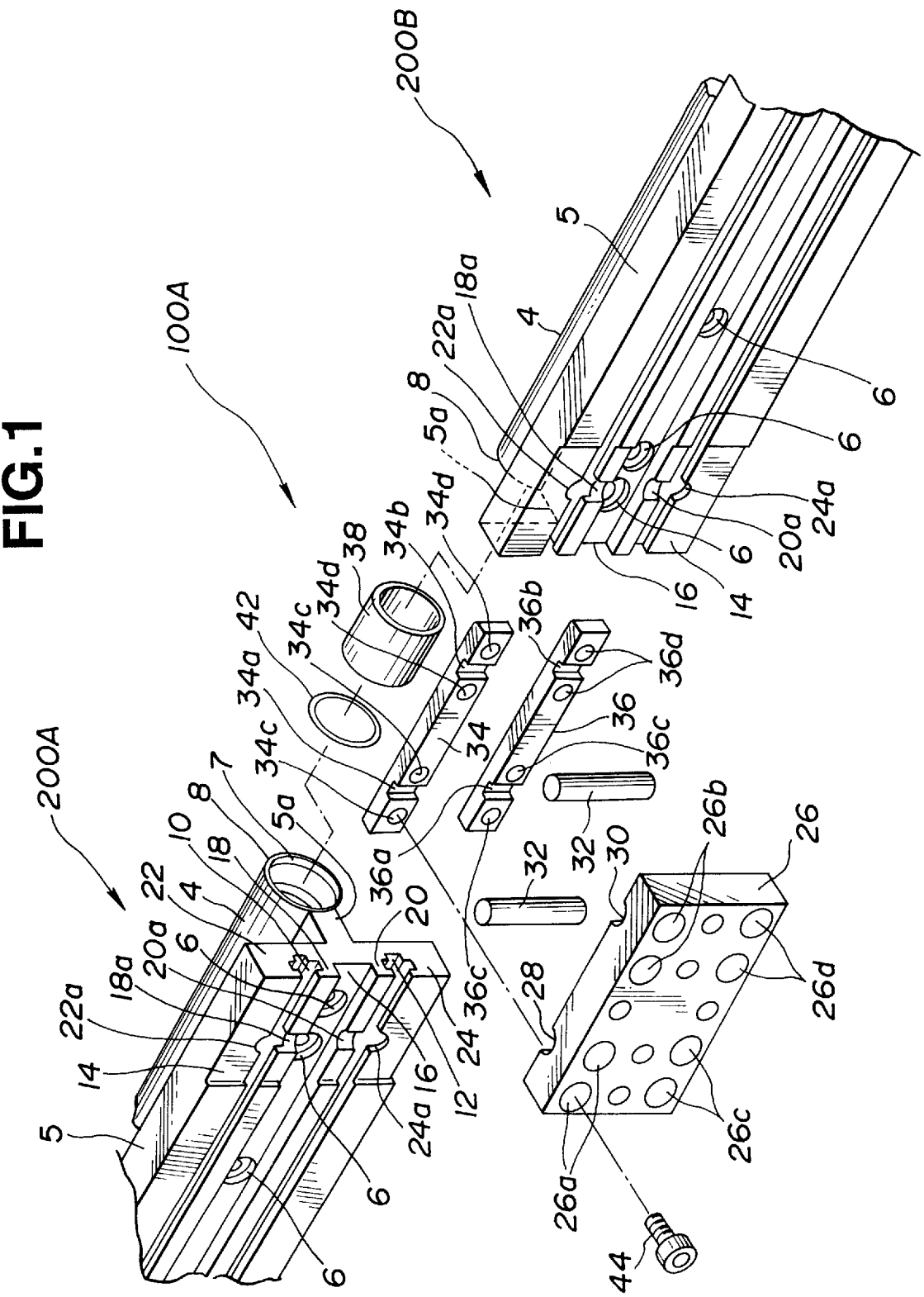
FIG. 1 is an exploded perspective view of a connector of a first embodiment of the present invention, with two tubular guide rails which are to be coupled by the connector.
Figure 2:
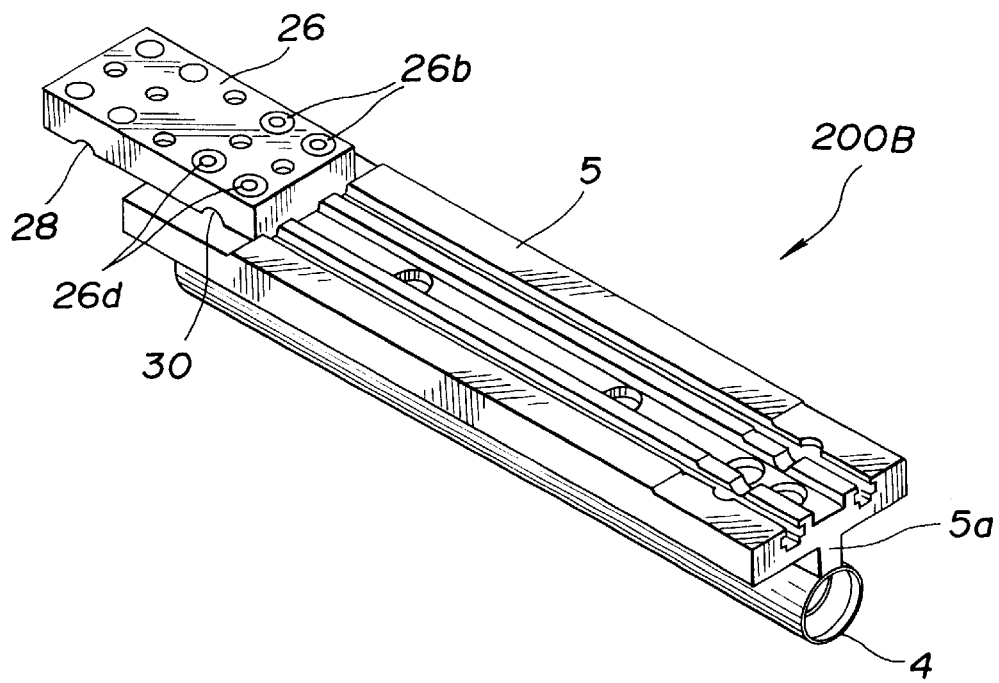
FIG. 2 is a perspective view of one tubular guide rail which has a joint plate of the connector attached to one end thereof.

Referring to FIGS. 1 to 7, particularly FIG. 1, there is shown in an exploded manner a connector 100A of a first embodiment of the present invention, which is constructed to couple two tubular guide rails 200A and 200B assuring a hermetically sealed connection therebetween.

As has been described hereinabove, each tubular guide rail 200A or 200B has a generally T-shaped cross section, including a pipe part 4 and a base part 5. The base part 5 is formed with a ridge portion 5a which supports thereon the pipe part 4. Denoted by numerals 6 are openings each receiving therein a bolt (no numeral) for securing the pipe part 4 to the base part 5.

As is seen from FIG. 6A, each pipe part 4 is machined so that a bore thereof has a diametrically enlarged end portion 7. The diameter of a major part of the bore is denoted by "d", the diameter of the enlarged bore end portion 7 is denoted by "$d_1$" and the axial length of the same is denoted by "$l_1$". The open end 8 of the pipe part 4 is tapered, and the terminal end 9 of the enlarged end portion 7 is chamfered.

If desired, the tapered open end 8 of the pipe part 4 may have such a shape as shown in FIG. 6B or FIG. 6C.

In the shape of FIG. 6B, the tapered open end 8 is formed with a plurality of dimples 8a, while, in the shape of FIG. 6C, the tapered open end 8 is formed with coaxial annular grooves 8b and 8c. As will be described hereinafter, provision of such dimples 8a and grooves 8b and 8c on the tapered open end 8 improves a hermetically sealed connection between two tubular guide rails 200A and 200B.

Referring back to FIG. 1, each base part 5 is formed at its bottom surface with two longitudinally extending parallel grooves 10 and 12, each having a generally cross-shaped cross section. The bottom surface of the base part 5 is depressed at each end portion to constitute a depressed mounting flat surface 14.

Between the two parallel grooves 10 and 12, there is defined a longitudinally extending groove 16, which has two inner banks 18 and 20 defined along the same. Due to presence of the grooves 10 and 12, there are defined two outer banks 22 and 24 which extend along the grooves 10 and 12.

As shown, at the depressed mounting flat surface 14, the two inner banks 18 and 20 are respectively formed with rounded recesses 18a and 20a and the two outer banks 22 and 24 are respectively formed with rounded cuts 22a and 24a. These recesses 18a and 20a and cuts 22a and 22b are aligned in a direction perpendicular to the longitudinal axis of the guide rail 200A or 200B. That is, these recesses 18a and 20a and the cuts 22a and 22b are incorporated to define one incomplete elongate recess which partially receives a positioning pin 32 as will be described in detail hereinafter.

The connector 100A comprises a rectangular joint plate 26. This plate 26 is formed with two parallel grooves 28 and 30 each being semi-cylindrical in shape. These rounded grooves 28 are 30 are constructed to partially receive positioning pins 32 which are constructed of a hard metal, such as steel or the like.

Figure 3:
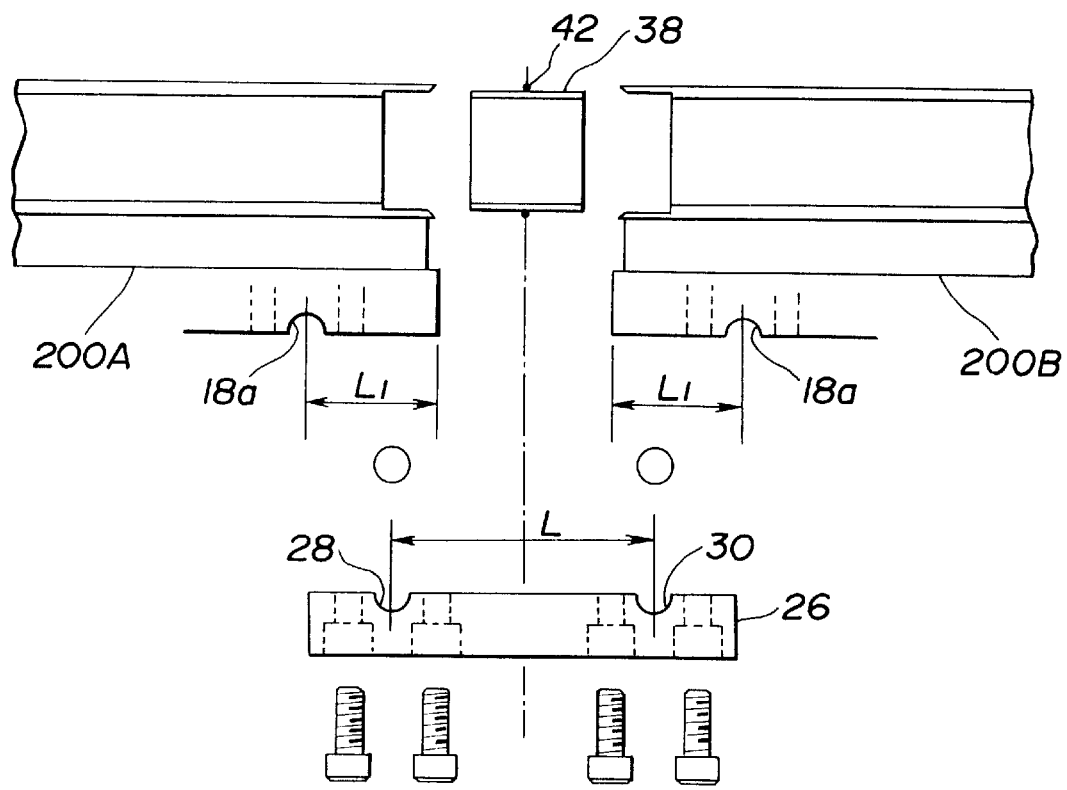
FIG. 3 is a schematically illustrated exploded plan view of the connector with the two tubular guide rails, showing a dimensional relationship therebetween.
Figure 4:
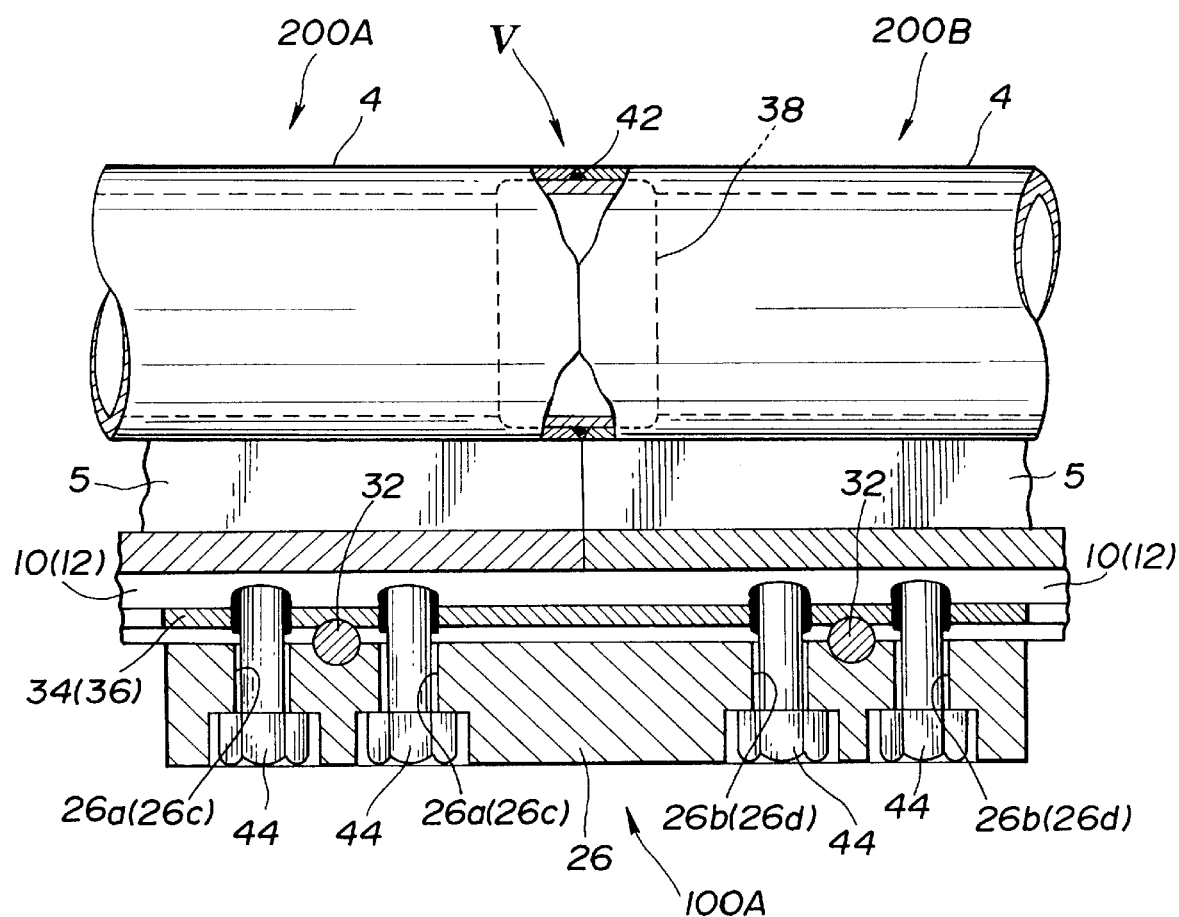
FIG. 4 is a partially sectional view of the connector in an assembled condition with the two tubular guide rails properly coupled.
Figure 5:
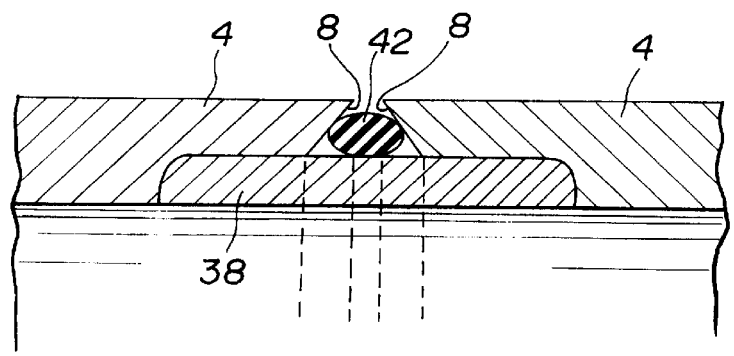
FIG. 5 is an enlarged sectional view of the portion indicated by an arrow "V" in FIG. 4.
Figure 6:
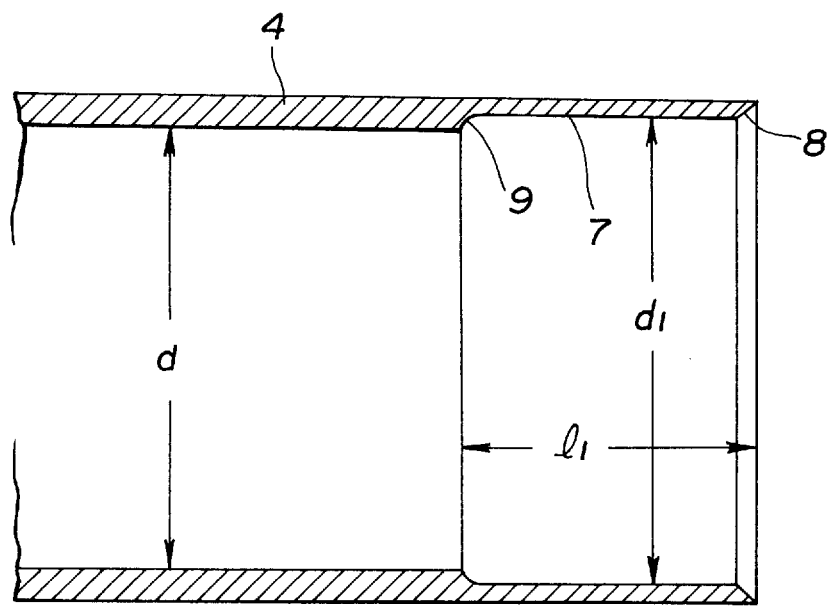
FIG. 6A is a sectional view of an end portion of a pipe part of the tubular guide rail.
FIG. 6B is an enlarged sectional view showing a modification of the end portion of the pipe part of the tubular guide rail.
FIG. 6C is a view similar to FIG. 6B, but showing another modification of the end portion of the pipe part of the tubular guide rail.
Figure 6:
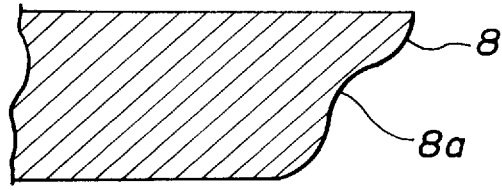
Figure 6:
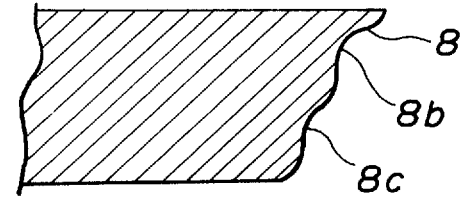

In the first embodiment, the following dimensional relationship is established between the connector 100A and the guide rails 200A and 200B, which is depicted in FIG. 3.

$$L = 2 \times L_1 \tag{1}$$

wherein:

L: distance between parallel grooves 28 and 30 of joint plate 26, and $L_1$: distance between rounded recess 18a and terminal end of the guide rail 200A or 200B.

Referring back to FIG. 1, each positioning pin 32 is a cylindrical member having circular and flat ends. The joint plate 26 is formed with four pairs of bolt openings 26a, 26b, 26c and 26d.

The connector 100A further comprises two elongate bridge pieces 34 and 36 which are constructed to be slidably received in the grooves 10 and 12 of the base part 5 of the tubular guide rail 200A or 200B. Each bridge piece 34 or 36 is formed with two recesses 34a and 34b (or, 36a and 36b). Each bridge piece is formed with two pairs of threaded bores 34c and 34d (or, 36c and 36d). Each pair are positioned at both sides of the corresponding recess 34a, 34b, 36a or 36b, as shown.

It is now to be noted that the distance between the two recesses 34a and 34b (or, 36a and 36b) is equal to the distance "L" between the parallel grooves 28 and 30 of the joint plate 26. It is further to be noted that, upon assembly of the connector 100A, the paired bores 34c and 34d of the bridge piece 34 are mated with the paired bolt openings 26a and 26b of the joint plate 26, and the paired bores 36c and 36d of the other bridge piece 36 are mated with the paired bolt openings 26c and 26d of the joint plate 26. For the mating between the bridge pieces 34 and 36 and the joint plate 26, a plurality of bolts 44 are used, each having a hexagon socket head.

The connector 100A further comprises a coupling sleeve 38 and an O-ring 42 of hard rubber or the like.

Figure 7:
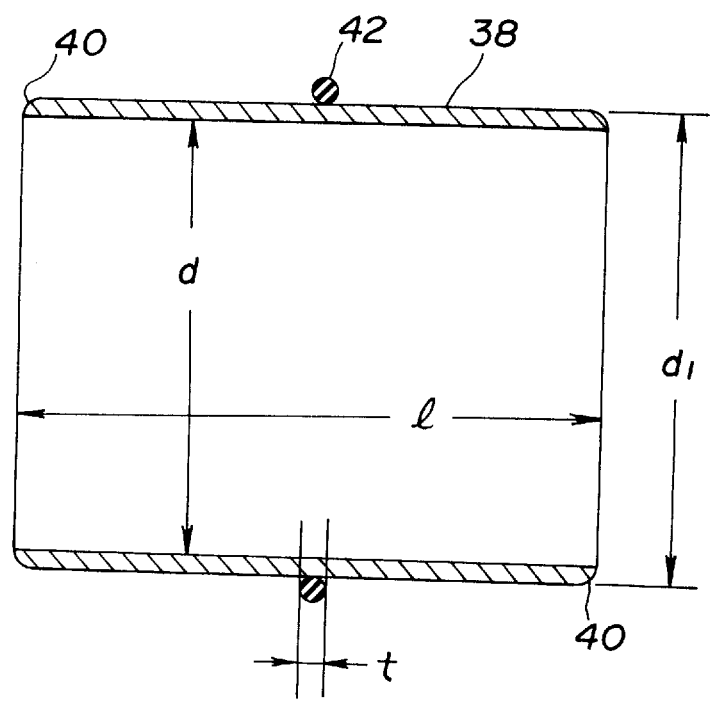
FIG. 7 is an enlarged sectional view of a coupling sleeve which constitutes a part of the connector of the first embodiment.

As is seen from FIG. 7, the coupling sleeve 38 has an outer diameter of "$d_1$" which is equal to the inner diameter of the enlarged bore end portion 7 of the pipe part 4 (see FIG. 6A), and has an inner diameter "d" which is equal to the diameter of the major part of the bore of the pipe part 4. The axial length of the coupling sleeve 38 is denoted by "l". Each end of the coupling sleeve 38 is chamfered, which is denoted by numeral 40. Upon assembly of the connector 100A, each chamfered end 40 is tightly mated with the chamfered terminal end 9 of the enlarged end portion 7 of the bore of each pipe part 4. The O-ring 42 is put on the coupling sleeve 38 when in use. The thickness of the O-ring 42 in non-stressed condition is denoted by "t".

The following dimensional relationship is established.

$$l = 2 \times l_1 + t \tag{2}$$

wherein:

l: axial length of coupling sleeve 38, $l_1$: axial length of enlarged bore end portion 7 of each pipe part 4, and t: thickness of O-ring 42 in non-stressed state.

In the following, steps for coupling the tubular guide rails 200A and 200B by using the connector 100A will be described with reference to the drawings.

First, as will be understood from FIG. 1, the two bridge pieces 34 and 36 are slid into the grooves 10 and 12 of one (for example, 200A) of the guide rails 200A and 200B, respectively. Then, as may be understood from FIGS. 1, 6 and 7, the coupling sleeve 38 having the O-ring 42 put thereon is put into the enlarged bore end portion 7 of the pipe part 4 of one (for example, 200A) of the two guide rails 200A and 200B. With this, a half part of the coupling sleeve 38 is exposed from the guide rail 200A. The other guide rail 200B is then brought to the guide rail 200A, and the exposed half part of the coupling sleeve 38 is put into the enlarged bore end portion 7 of the other guide rail 200B. Then, relative positioning between the two guide rails 200A and 200B is adjusted so that the grooves 10 and 12 of one guide rail 200A become mated with those of the other guide rail 200B. Then, each bridge piece 34 or 36 is slid in the mated grooves 10 or 12 of the two guide rails 200A and 200B and brought to a given center position where the recess 34a or 36a of the bridge piece registers with the rounded recess 18a or 20a of one guide rail 200A and where the recess 34b or 36b of the bridge piece registers with the rounded recess 18a or 20a of the other guide rail 200B. With this, two groups of registered recesses are defined in the respective depressed mounting flat surfaces 14 of the guide rails 200A and 200B.

It is now to be noted that under this condition, due to presence of the O-ring 42 (see FIG. 5) put between the tapered ends 8 of the respective pipe parts 4 of the two guide rails 200A and 200B, the distance between the two of registered recesses (more specifically, the distance between the rounded recesses 18a (or 20a) of one guide rail 200A and that of the other guide rail 200B) is somewhat greater than that between the grooves 28 and 30 of the joint plate 26.

That is, the following inequality is established:

$$L < 2 \times L_1 + t \tag{3}$$

Then, the two positioning pins 32 are respectively put into the two groups of registered recesses of the respective depressed mounting flat surfaces 14 of the guide rails 200A and 200B. Then, the joint plate 26 is put on the depressed mounting flat surfaces 14 while partically receiving the two positioning pins 32 in the grooves 28 and 30 thereof.

It is now to be noted that, due to the same reason as has mentioned hereinabove, under this condition, the two positioning pins 32 are not neatly received in the grooves 28 and 30. This condition will be understood from FIG. 11.

Then, four bolts 44 (see FIG. 1) are put into outer ones of the four pairs of bolts openings 26a, 26b, 26c and 26d of the joint plate 26 and turned in a tightening direction to engage with outer ones of the corresponding threaded bores 34c, 34d, 36c and 36d of the two bridge pieces 34 and 36. With this, the two guide rails 200A and 200B are coupled.

During the tightening turning of the bolts 44, the following advantageous movement is carried out by the two guide rails 200A and 200B.

Figure 11:
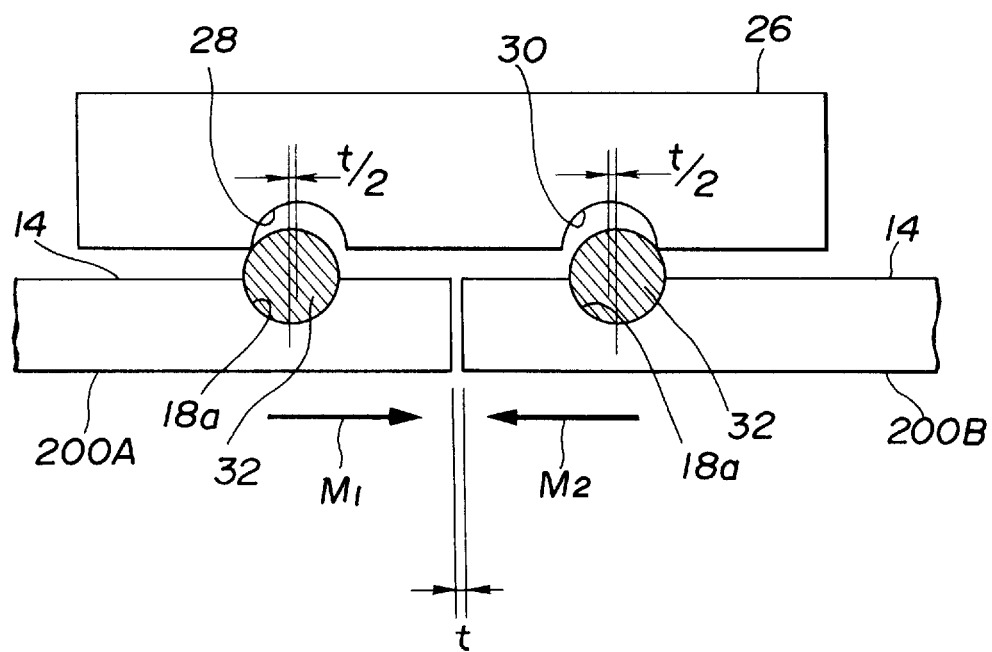
FIG. 11 is an illustration showing an advantageous phenomenon achieved by the present invention.

That is, as is understood from FIG. 11, when, due to the tightening turning of the bolts 44, the joint plate 26 is gradually pressed against the two guide rails 200A and 200B (more specifically, against the depressed mounting flat surfaces 14), outer edges of the grooves 28 and 30 of the joint plate 26 urge the corresponding positioning pins 32 to move inward and thus the two guide rails 200A and 200B are forced to move toward each other, as is indicated by arrows M1 and M2 in FIG. 11.

Figure 12:
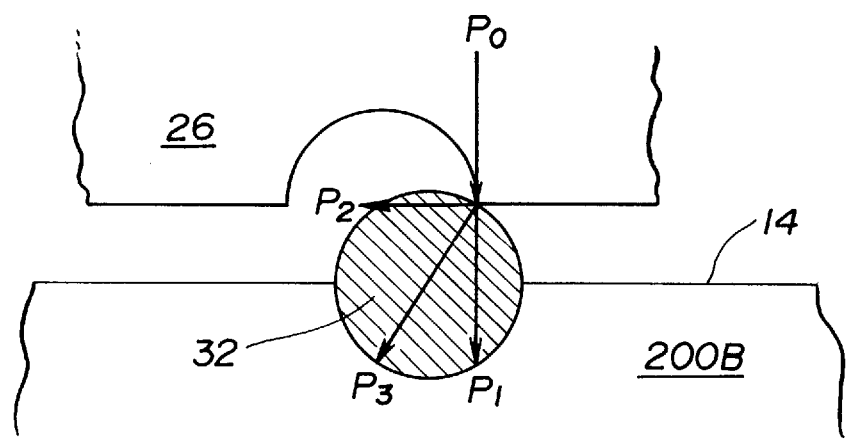
FIG. 12 is an illustration showing various forces transmitted through a cylindrical positioning pin.
Figure 13:
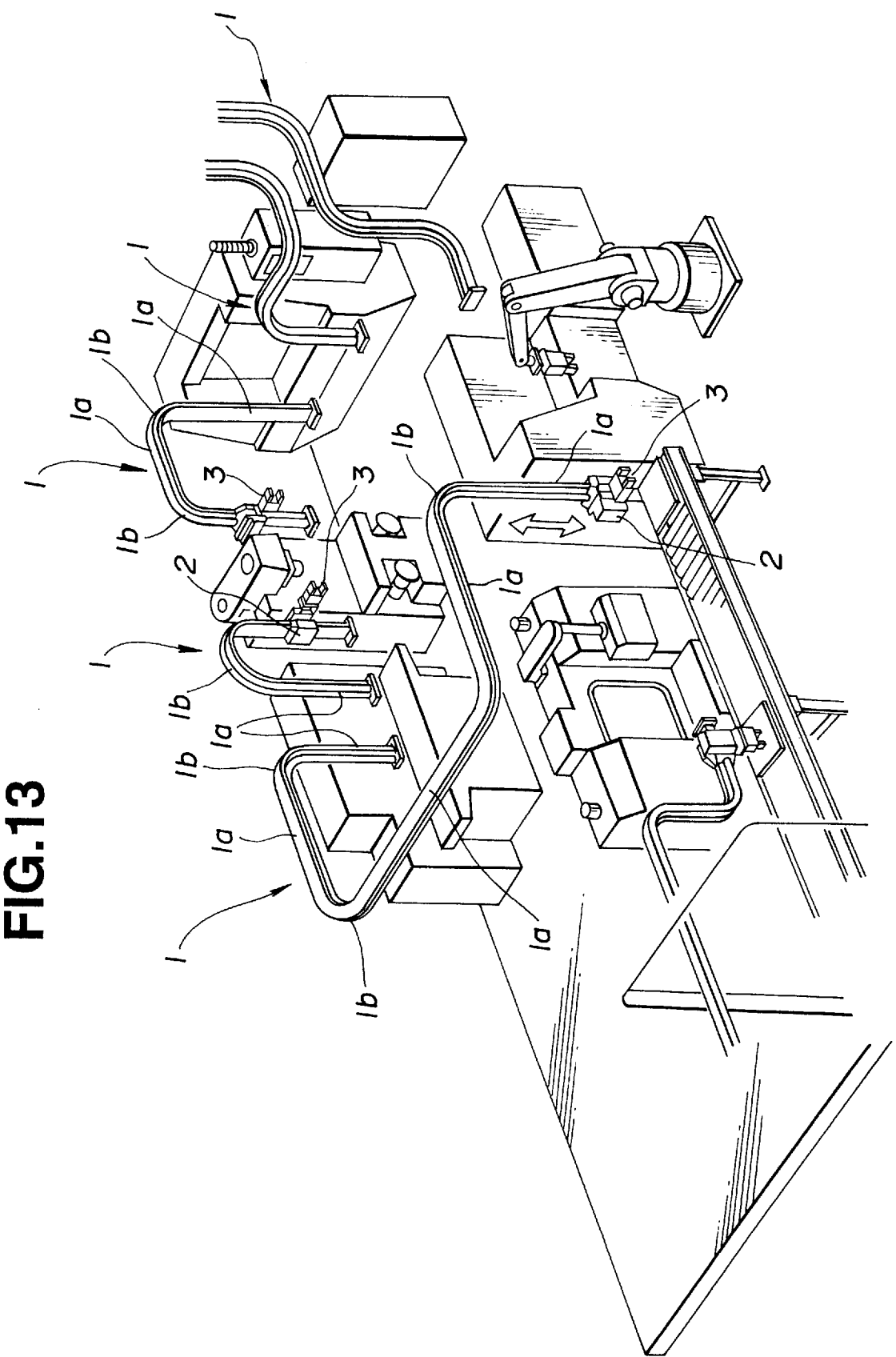
FIG. 13 is a perspective view of a production line in which a fluid-power transportation system is practically used.
Figure 14:
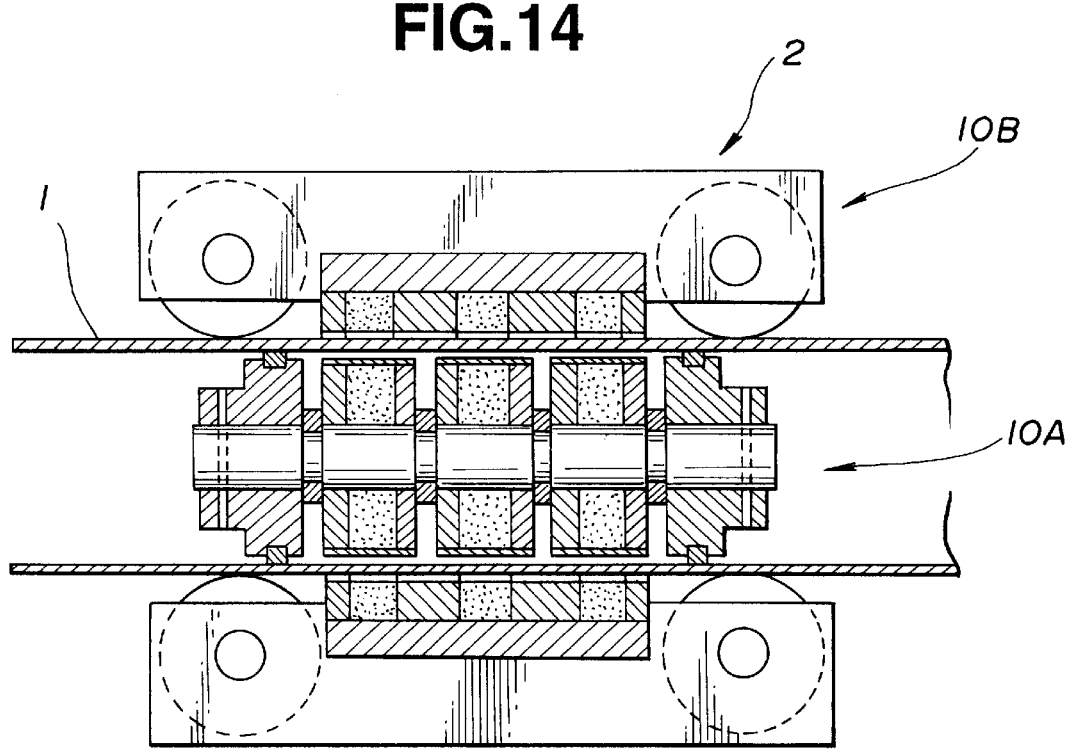
FIG. 14 is a sectional view of a work carrier which runs along the tubular guide rail.
Figure 15:
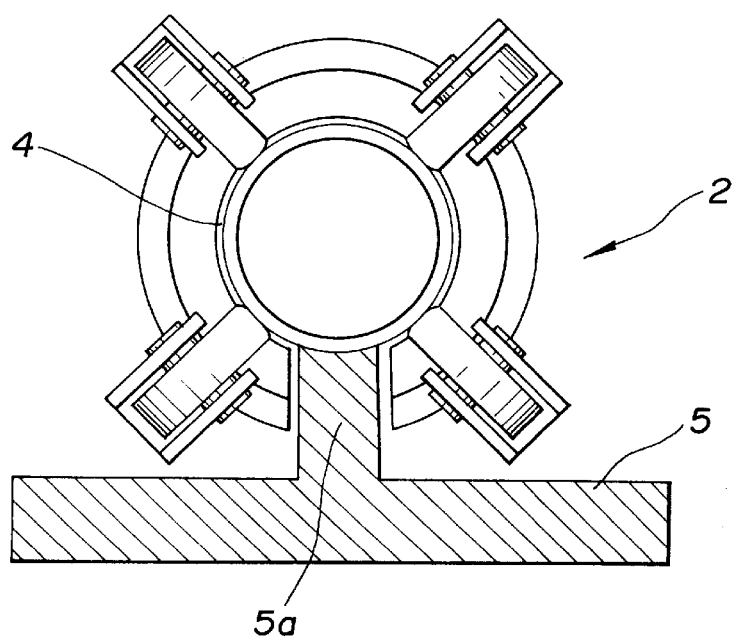
FIG. 15 is a sectional view of a tubular guide rail with an outer slider of the work carrier mounted thereon.

In fact, as is seen from FIG. 12, when the joint plate 26 is pressed against the guide rail 200B with a pressing force $P_0$, the positioning pin 32 and thus the guide rail 200B are urged to move leftward with a force of $P_2$ which is a lateral component of the pressing force $P_0$.

When the joint plate 26 is further pressed and finally attached intimately to the two guide rails 200A and 200B, terminal ends of the two guide rails 200A and 200B contact each other. Upon this, the O-ring 42 is sufficiently compressed by the tapered ends 8 of the pipe parts 4, as is understood from FIGS. 4 and 5. More specifically, upon this, as is seen from FIG. 5, the O-ring 42 is pressed, by the tapered ends 8 of the respective pipe parts 4, against the cylindrical outer surface of the coupling sleeve 38 and thus a hermetical sealing between the two pipe parts 4 is achieved.

Then, remaining four bolts 44 are put into inner ones of the four pairs of bolts openings 26a, 26b, 26c and 26d of the joint plate 26 and turned in the tightening direction to tightly engage with the corresponding threaded inner bores 34c, 34d, 36c and 36d of the two bridge pieces 34 and 36. With this, as is seen from FIG. 4, the two guide rails 200A and 200B are tightly coupled achieving a hermetically sealed connection between the two pipe parts 4 thereof.

When the tapered ends 8 of the respective pipe parts 4 have such a shape as shown in FIG. 6B or 6C, much assured hermitical sealing is achieved between the two pipe parts 4.

Figure 8:
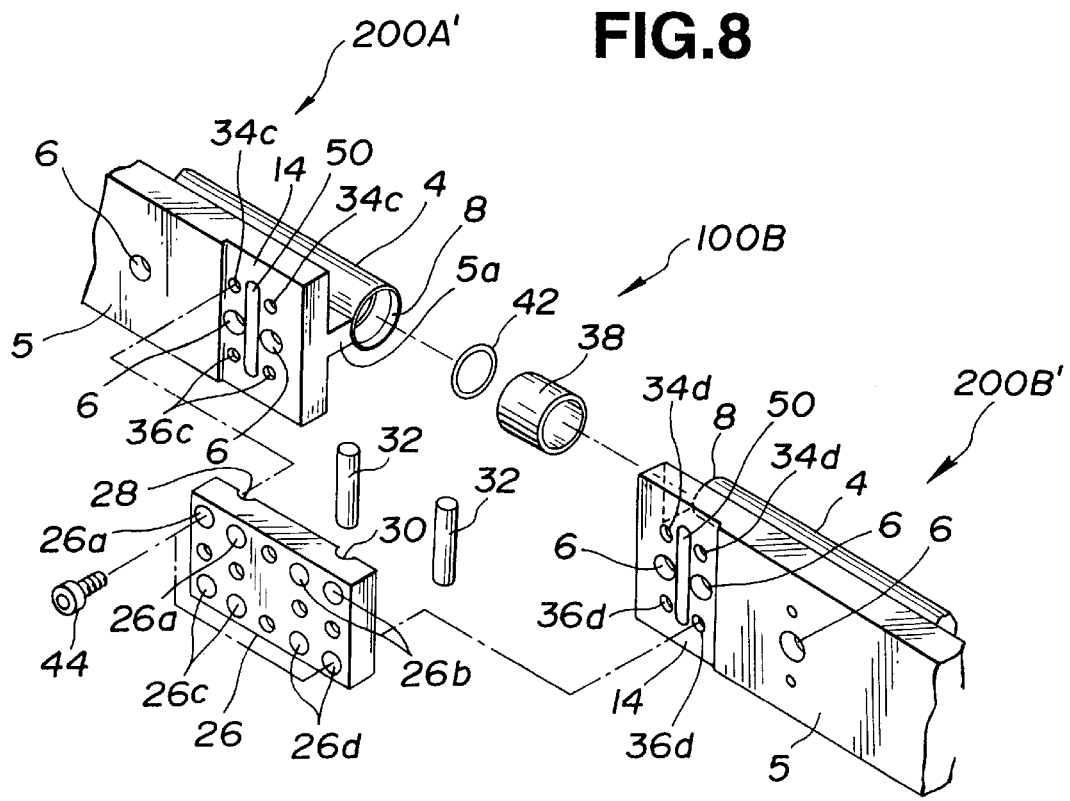
FIG. 8 is a view similar to FIG. 1, but showing a connector of a second embodiment of the present invention.
Figure 9:
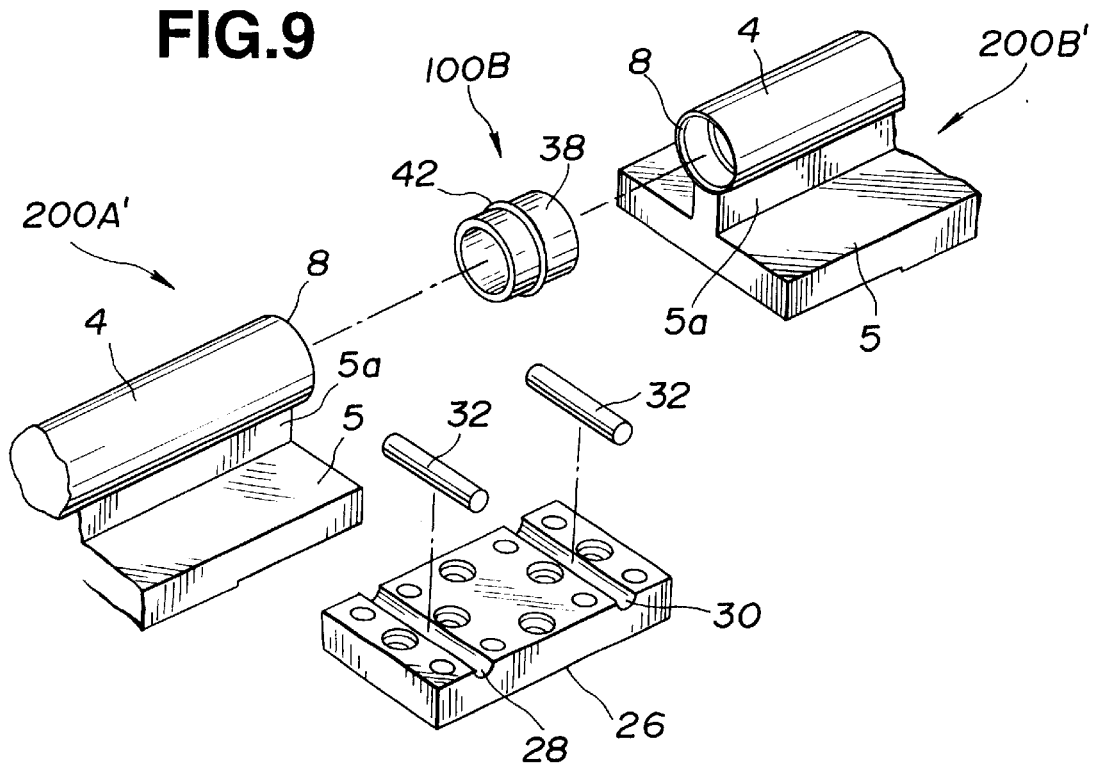
FIG. 9 is a view similar to FIG. 8, but taken from a different direction.
Figure 10:
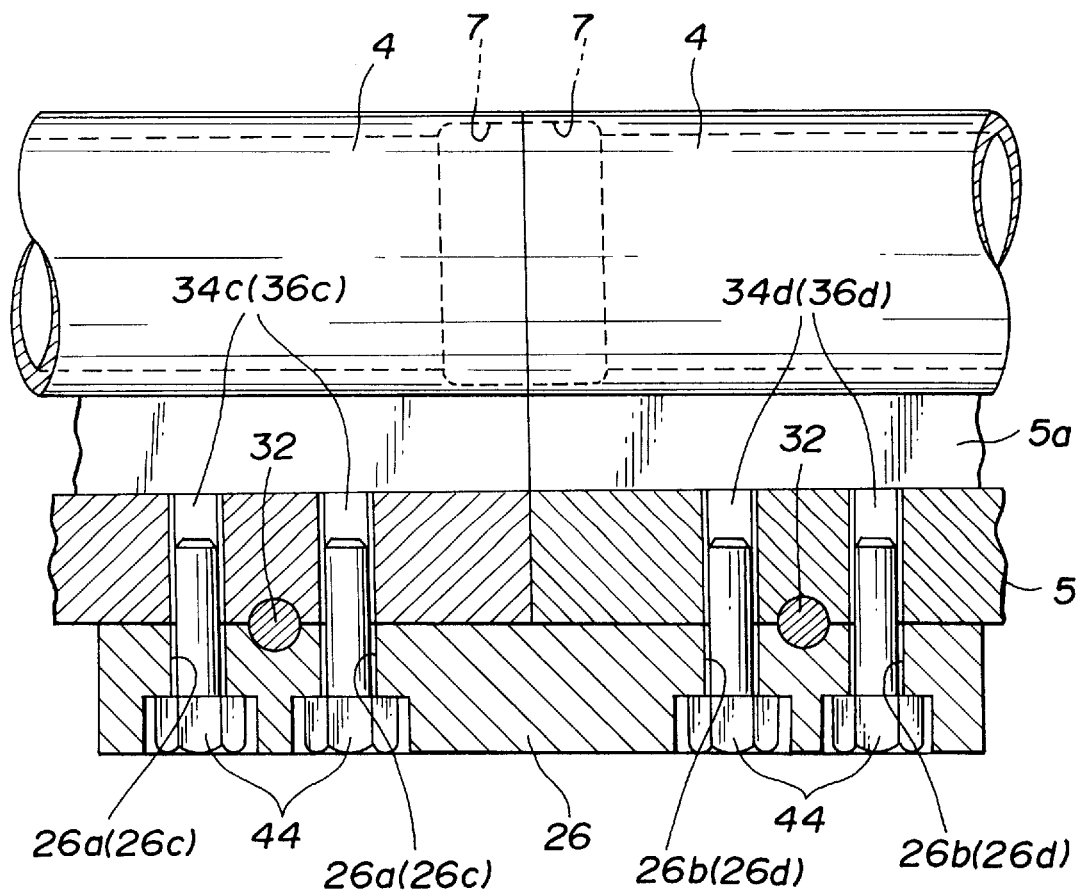
FIG. 10 is a partially sectional view of the connector of the second embodiment in an assembled condition with the two tubular guide rails properly coupled.

Referring to FIGS. 8, 9 and 10, particularly FIG. 8, there is shown in an exploded manner a connector 100B of a second embodiment of the present invention, which is constructed to couple two tubular guide rails 200A' and 200B' assuring a hermetically sealed connection therebetween.

As will become apparent as the description proceeds, in the second embodiment 100B, there is no means which corresponds to the bridge pieces 34 and 36 employed in the above-mentioned first embodiment 100A.

Each tubular guide rail 200A' or 200B' has a generally T-shaped cross section, including a pipe part 4 and a base part 5. The base part 5 is formed with a ridge portion 5a for supporting the pipe part 4. Denoted by numerals 6 are openings each receiving therein a bolt (no numeral) for securing the pipe 4 to the base part 5.

Each pipe part 4 has the same construction as the pipe part 4 as described in the first embodiment. That is, as is seen from FIG. 10, the bore of each pipe part 4 has a diametrically enlarged end portion 7. The open end 8 of each pipe part 4 is tapered.

Referring back to FIG. 8, the bottom surface of the base part 5 is depressed at each end portion to constitute a depressed mounting flat surface 14. The depressed mounting flat surface 14 is formed with a rounded recess 50 which extends perpendicular to the longitudinal axis of the guide rail 200A' or 200B'. This rounded recess 50 partially receives a positioning pin 32 as will be described in detail hereinafter.

The depressed mounting flat surface 14 is further formed with two pairs of threaded openings 34c and 36c (or, 34d and 36d). Each pair are positioned at both sides of the corresponding rounded recess 50, as shown.

The connector 100B comprises a rectangular joint plate 26. This plate 26 is formed with two parallel grooves 28 and 30 each being semi-cylindrical in shape. These grooves 28 and 30 are constructed to partially receive positioning pins 32.

Also, in the second embodiment, the following dimensional relationship is established between the connector 100B and the guide rails 200A' and 200B'.

$$L = 2 \times L_1 \tag{4}$$

wherein:

L: distance between parallel grooves 28 and 30 of joint plate 26, and $L_1$: distance between rounded recess 50 and terminal end of the guide rail 200A' or 200B'.

Each positioning pin 32 is a cylindrical member having circular and flat ends. The joint plate 26 is formed with four pairs of bolts openings 26a, 26b, 26c and 26d which are constructed to receive bolts 44 respectively.

The connector 100A further comprises a coupling sleeve 38 and an O-ring of hard rubber or the like.

Like in the first embodiment, an outer diameter of the coupling sleeve 38 is equal to the inner diameter of the enlarged bore end portion 7 of the pipe part 4, and an inner diameter of the coupling sleeve 38 is equal to the inner diameter of the major part of the pipe part 4.

Also, in this second embodiment, the following dimensional relationship is established.

$$l = 2 \times l_1 + t \quad (5)$$

wherein:

l: axial length of coupling sleeve 38, $l_1$: axial length of enlarged bore end portion 7 of each pipe part 4, and t: thickness of O-ring 42 in non-stressed state.

In the following, steps for coupling the tubular guide rails 200A' and 200B' by using the connector 100B will be described with reference to the drawings.

First, as may be understood from FIG. 9, the coupling sleeve 38 having the O-ring 42 put thereon is put into the enlarged bore end portion 7 of the pipe part 4 of one (for example, 200A') of the two guide rails 200A' and 200B'. With this, a half of the coupling sleeve 38 is exposed from the guide rail 200A'. The other guide rail 200B' is then brought to the guide rail 200A', and the exposed half part of the coupling sleeve 38 is put into the enlarged bore end portion 7 of the other guide rail 200B'. Then, relative angular positioning between the two guide rails 200A' and 200B' is adjusted so that respective depressed mounting flat surfaces 14 of them become flush with each other It is now to be noted that under this condition, due to presence of the O-ring 42 put between the tapered ends 8 of the respective pipe parts 4 of the two guide rails 200A' and 200B', the distance between the two rounded recesses 50 of the aligned but slightly spaced two guide rails 200A' and 200B' is somewhat greater than that between the grooves 28 and 30 of the joint plate 26.

That is, the following inequality is established:

$$l < 2 \times l_1 + t \quad (6)$$

Then, the two positioning pins 32 are put into the rounded recesses 50 respectively. Then, the joint plate 26 is put on the depressed mounting flat surfaces 14 while partially receiving the two positioning pins 32 in the grooves 28 and 30 thereof.

It is now to be noted that, due to the same reason as has mentioned hereinabove, under this condition, the two positioning pins 32 are not neatly received in the grooves 28 and 30. This condition will be understood from FIG. 11.

Then, four bolts 44 are put into outer ones of the four pairs of bolt openings 26a, 26b, 26c and 26d of the joint plate 26 and turned in a tightening direction to engage with outer ones of the corresponding threaded bores 34c, 34d, 36c and 36d of the two guide rails 200A' and 200B'. With this, the two guide rails 200A' and 200B' are coupled.

During the tightening turning of the bolts 44, advantageous movement is carried out by the guide rails 200A' and 200B' like in the above-mentioned first embodiment.

That is, as may be understood from FIG. 11, when, due to the tightening turning of the bolts 44, the joint plate 26 is gradually pressed against the two guide rails 200A' and 200B', outer edges of the grooves 28 and 30 of the joint plate 26 urge the corresponding positioning pins 32 and thus urge the two guide rails 200A' and 200B' to move toward each other.

When the joint plate 26 is further pressed and finally attached intimately to the two guide rails 200A' and 200B', terminal ends of the two guide rails 200A' and 200B' contact each other. Upon this, the O-ring 42 is sufficiently compressed by the tapered ends 8 of the pipe parts 4.

Then, remaining four bolts 44 are put into the inner ones of the four pairs of bolt openings 26a, 26b, 26c and 26d of the joint plate 26 and turned in a tightening direction to engage with inner ones of the corresponding threaded bores 34c, 34d, 36c and 36d of the two guide rails 200A' and 200B'. With this, as is seen from FIG. 10, the two guide rails 200A' and 200B' are tightly coupled achieving a hermetically sealed connection between the two pipe parts 4 thereof.

What is claimed is:

1. A connector for connecting two structures which have mutually facing terminal ends to be mated, comprising:

means for defining in each of the structures a rounded recess;

a seal member of elastic material, said seal member located between the terminal ends of the two structures;

a joint plate having two rounded recesses, said joint plate being connected to the two structures in such a manner that each of the rounded recesses of the joint plate mates with the rounded recess of each structure thereby to define a substantially rounded space;

two cylindrical pins each received in the substantially rounded space; and securing means which, when actuated, gradually presses said joint plate against said structures and finally secures said joint plate to said structures, wherein said two structures, said seal member, said cylindrical pins and said joint plate are so arranged as to satisfy the following equation before actuation of said securing means, $$L < 2 \times L_1 + t$$

wherein:

L: the distance between the two rounded recesses of the joint plate, $L_1$: the distance between the rounded recess of each structure and the terminal end of the same, and t: the thickness of the seal member in nonstressed state.

2. A connector for connecting two tubular guide rails which have terminal ends to be mated, comprising:

first means for defining in each of the tubular guide rails an elongate rounded recess which extends perpendicular to the longitudinal axis of the tubular guide rail;

a seal member of elastic material located between said terminal ends of the two tubular guide rails;

a joint plate having two parallel elongate rounded recesses formed therein, said joint plate being connected to the two tubular guide rails in such a manner that each of the parallel elongate rounded recesses mates with the elongate rounded recess of the corresponding tubular guide rail to define a substantially cylindrical pin receiving space;

two cylindrical positioning pins each received in the substantially cylindrical pin receiving space; and second means which, when actuated, gradually presses said joint plate against said tubular guide rails and finally secures said joint plate to said tubular guide rails, wherein said first means, said seal member and said joint plate are so arranged as to satisfy the following equation before actuation of the second means, $$L < 2 \times L_1 + t$$

wherein:

L: the distance between the parallel elongate rounded recesses of the joint plate, $L_1$: the distance between the elongate rounded recesses of each tubular guide rail and the terminal end of the same, and t: the thickness of the seal member in non-stressed state.

3. A connector as claimed in claim 2, wherein each tubular guide rail includes a pipe part and in which said seal member is an O-ring of elastomeric material which is located, between circular open ends of pipe parts of the two tubular guide rails.

4. A connector as claimed in claim 3, in which the circular open end of each pipe part is tapered.

5. A connector as claimed in claim 4, in which the tapered open end of each pipe part is formed with a plurality of dimples.

6. A connector as claimed in claim 4, in which the tapered open end of each pipe part is formed with coaxial annular grooves.

7. A connector as claimed in claim 4, further comprising:
   a coupling sleeve having said O-ring thereon, said coupling sleeve having one half received in one of said pipe parts and the other half received in the other of said pipe parts.

8. A connector as claimed in claim 7, in which each of said pipe parts is formed with a diametrically enlarged bore end portion into which one half of said coupling sleeve is intimately received.

9. A connector as claimed in claim 2, in which each of said tubular guide rails is formed with a depressed mounting flat surface onto which a half of said joint plate is intimately disposed.

10. A connector as claimed in claim 2, in which said second means comprises:
    means for defining in each of the tubular guide rails a longitudinally extending groove;
    an elongate bridge piece slidably received in said longitudinally extending groove, said bridge piece having one half received in the groove of one tubular guide rail and the other half received in the groove of the other tubular guide rail; and
    bolts for securing said joint plate to said bridge piece.

11. A connector as claimed in claim 10, in which said second means further comprises:
    means for defining, in said elongate bridge piece, threaded openings; and
    means for defining, in said joint plate, bolt openings,
    wherein the bolts pass through said bolt openings and operatively engage with said threaded openings.

12. A connector as claimed in claim 10, in which said bridge piece is formed with two recesses which are spaced by the distance of "L", the two recesses being respectively mated with the elongate rounded recesses of the two tubular guide rails.

13. A connector as claimed in claim 2, in which said second means comprises:
    means for defining, in each of the two tubular guide rails, threaded openings;
    means for defining, in said joint plate, bolt openings; and
    bolts for securing the joint plate to said two tubular guide rails which pass through said bolt openings and operatively engage with said threaded openings.

14. A connector for connecting two tubular guide rails which have terminal ends to be mated, each tubular guide rail including a pipe part and a base part, said connector comprising:

first means for defining in the base part of each of the tubular guide rails an elongate rounded recess which extends perpendicular to the longitudinal axis of the tubular guide rail;

an O-ring of elastomeric material which is located between mutually facing ends of the pipe parts of the two tubular guide rails;

a joint plate having two parallel elongate rounded recesses formed herein, said joint plate being connected to the base parts of the two tubular guide rails in such a manner that each of the parallel elongate rounded recesses mates with the elongate rounded recess of the corresponding tubular guide rail to define a substantially cylindrical pin receiving space;

two cylindrical positioning pins each received in the substantially cylindrical pin receiving space;

second means for defining in the base part of each of the tubular guide rails two longitudinally extending grooves;

two elongate bridge pieces slidably received in the two longitudinally extending grooves respectively, each bridge piece being capable of taking a position wherein one half of the bridge piece is received in the groove of one tubular guide rail and the other half of the same is received in the groove of the other tubular guide rail; and bolts for securing said joint plate to the base parts of the two tubular guide rails by gradually pressing the joint plate against said base parts, wherein said first means, said O-ring and said joint plate are so arranged as to satisfy the following equation before said joint plate is pressed against said base parts by said bolts, $$L < 2 \times L_1 + t$$

wherein:

L: the distance between the parallel elongate rounded recesses of the joint plate, $L_1$: the distance between the elongate rounded recess of the base part of each tubular guide rail and the terminal end of the same, and t: the thickness of the O-ring in non-stressed state.

15. A connector for connecting two tubular guide rails which have terminal ends to be mated, each tubular guide rail including a pipe part and a base part, said connector comprising:

first means for defining in the base part of each of the tubular guide rails an elongate rounded recess which extends perpendicular to the longitudinal axis of the tubular guide rail;

an O-ring of elastomeric material which is located between mutually facing ends of the pipe parts of the two tubular guide rails;

a joint plate having two parallel elongate rounded recesses formed herein, said joint plate being connected to the base parts of the two tubular guide rails in such a manner that each of the parallel elongate rounded recesses mates with the elongate rounded recess of the corresponding tubular guide rail to define a substantially cylindrical pin receiving space;

two cylindrical positioning pins each located in the substantially cylindrical pin receiving space;

second means for defining, in the base part of each of the tubular guide rails, threaded openings;

third means for defining, in the joint plate, bolt openings; and bolts which, for securing the joint plate to the base parts of the two tubular guide rails, pass through said bolt openings and operatively engage with said threaded openings, wherein said first means, said O-ring and said joint plate are so arranged as to satisfy the following equation before said joint plate is secured to said base parts by said bolts, $$L < 2 \times L_1 + t$$

wherein:
- L: the distance between the parallel elongate rounded recesses of the joint plate,
- $L_1$: the distance between the elongate rounded recess of the base part of each tubular guide rail and the terminal end of the same, and
- t: the thickness of the O-ring in non-stressed state.

* * * * *